A. NORTH.
Refrigerating-Cover.

No. 227,290.  Patented May 4, 1880.

WITNESSES:  INVENTOR:

UNITED STATES PATENT OFFICE.

ABIJAH NORTH, OF CHAMPLAIN, NEW YORK.

REFRIGERATING-COVER.

SPECIFICATION forming part of Letters Patent No. 227,290, dated May 4, 1880.

Application filed February 19, 1880.

*To all whom it may concern:*

Be it known that I, ABIJAH NORTH, of Champlain, Clinton county, and State of New York, have invented a new and Improved Refrigerating-Cover, of which the following is a specification.

The object of my invention is to provide a new and improved refrigerating-cover, to be placed over fruit, butter, and vegetables to keep them cool.

The invention consists of a vessel open at the bottom, provided with a packing-ring of rubber or like material, to be placed over victuals or dishes containing them, which vessel contains a perforated or wire-netting receptacle for receiving the ice, and resting upon a flanged drip-plate, which conducts the drip-water of the ice into the lower hollow part of the wall of the vessel, from which it can be drawn when necessary or desired.

Figure 1:
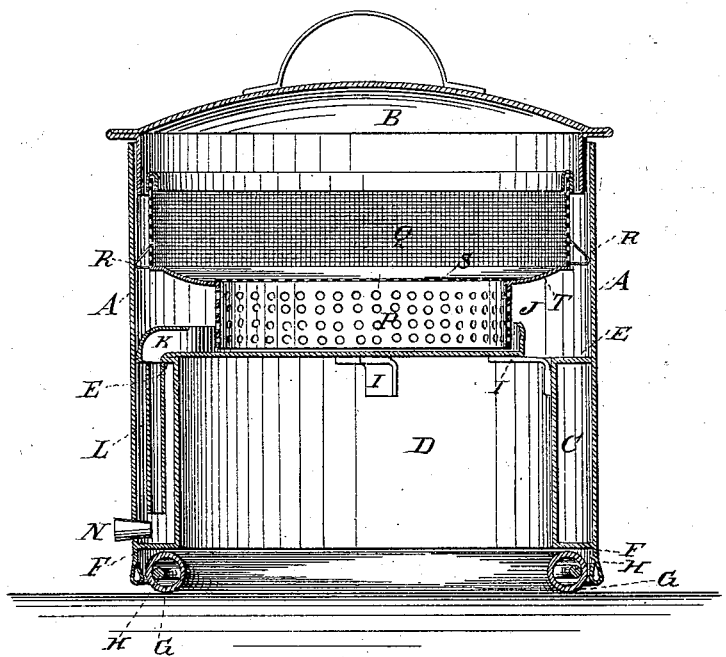
Figure 2:
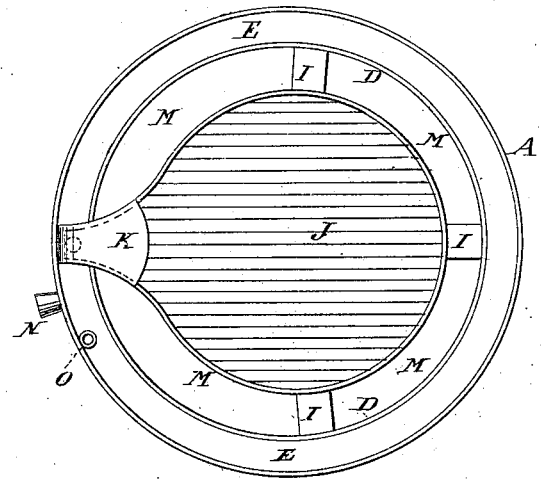

In the accompanying drawings, Figure 1 is a cross-sectional elevation of my refrigerating-cover. Fig. 2 is a plan view of the same, showing the lid removed.

Similar letters of reference indicate corresponding parts.

The vessel A, which may be of any desired size or shape, is provided with a lid, B, and with an annular or like space, C, formed in the lower half of its wall by a second interior wall, D, and the top and bottom strips, E and F, connecting the interior wall, D, with the main wall of the vessel. The main wall of the vessel extends down a short distance below the bottom F of the space C, and forms an angle with the said bottom strips. A packing-tube, G, of rubber or like material, containing a spreading-frame, H, of steel wire, is placed in the angle formed by the outside wall and the bottom F of the space C, so that the vessel A can rest on the said packing G, which is prevented from being spread too far and held in place by the part of the main wall of the vessel that projects beyond the bottom F.

From the inner wall, D, two or more brackets, I, project and support a flanged drip-plate, J, terminating in a spout, K, which leads into the space C. The end of the spout K is preferably connected with a tube, L, leading to the bottom of space C, so as to prevent the water from escaping through the spout in case the vessel is upset. The drip-plate J is smaller than the inner cross-dimensions of the vessel, so as to leave the spaces M M, through which the air can pass.

The space C is provided with an aperture closed by a cock or plug, N, through which the water can be drawn off, and with an air-vent, O.

Upon the drip-plate J a low frame, P, of perforated metal or wire-netting, rests, and carries a larger receptacle, Q, with sides and a bottom of wire-netting or perforated material, and serves to receive the ice. It is provided with a number of studs, R R, which fit closely in the vessel A, and prevent the receptacle Q from striking against the sides of the vessel A, and hold it tight. Only that part S of the floor of the receptacle Q above the perforated frame P is made of wire-netting, and the part T of the floor connecting the sides of the receptacle with the perforated frame P is made of solid material. The receptacle for receiving the ice need not have any bottom, but may consist only of a perforated frame resting upon the drip-plate J.

I do not wish to limit myself to any peculiar construction of the ice-receptacle Q, but may arrange it in any desired or suitable manner, it always being made to be supported by the drip-plate J. The lid B may be hinged, and may be provided with packing, if desired.

The upper half of the vessel may be made partly or entirely of glass, and may be made with a smaller diameter than the lower part.

The refrigerating-cover is used as follows: Ice having been placed in the ice-receptacle Q, the lid B is closed down tightly, and the cover is ready for use. It is now placed over the victuals that are to be kept cool, and rests on the plate, or, if the same is very small, surrounds the same and rests on the table. The rubber packing-tube G prevents any warm air from entering from below, and the warm air in the vessel immediately rises, comes in contact with the ice, and is cooled. As no fresh warm air is introduced, the air is cooled down considerably in a short time, and remains at this temperature, thus keeping the victuals and like substances under the cover in a fresh state. The air can freely circulate under and around the ice, and as the ice is on the top of the vessel, to which part the warm air has a tendency to rise, the cooling of the air takes place continually as long as there is any ice in the receptacle Q. The drip-water flows down the part T and through the part S of the floor of the receptacle Q, and drops onto the drip-plate J, and flows through the spout K and tube L into the space C, from which it can be drawn when desired.

Having thus described my invention, I claim as new and desire to secure by Letters Patent—

A refrigerating-cover consisting of the detachably-covered open-bottomed vessel A, having space C, formed by inner wall, D, and strips E F, the packing-tube G, containing wire frame H, the flanged drip-plate J, supported on brackets I, and having spout K, leading to space C, and the perforated frame P, carrying perforated receptacle Q, having studs R and solid part T, as shown and described.

ABIJAH NORTH.

Witnesses:
OSCAR F. GUNZ,
C. SEDGWICK.